Figure 1:
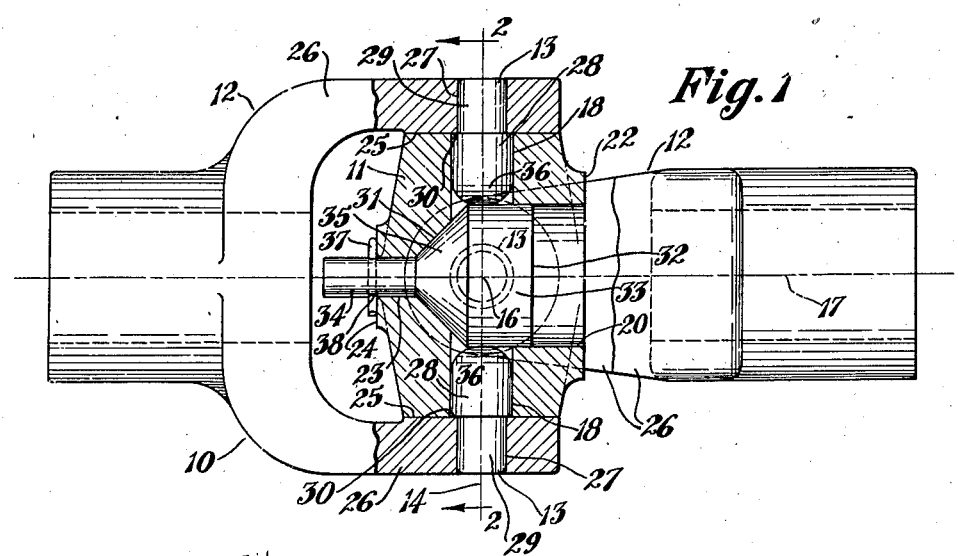

Aug. 22, 1939.    R. L. WONDERLY    2,170,315

UNIVERSAL JOINT

Filed Feb. 11, 1938

Inventor
Robert L. Wonderly

Patented Aug. 22, 1939

2,170,315

UNITED STATES PATENT OFFICE 2,170,315

UNIVERSAL JOINT

Robert L. Wonderly, Canton, Ohio

Application February 11, 1938, Serial No. 190,005

3 Claims. (Cl. 64—17)

The invention relates to universal and pivot joints, and more particularly to a universal joint including a pivot block, usually two opposite yokes, and pivot pins or trunnions, usually two for each yoke, separably associated with the pivot block and the yokes.

In usual universal joints, the trunnions are separably secured to either the pivot block or the yokes by screw means or by wedge or other frictional means.

When the trunnions are screw connected with either the pivot block or yokes, the assembly and disassembly of the joint requires considerable time, and difficulties are encountered particularly in providing trunnions of any desired size for strength and bearing area, and any desired bearings therefor.

Universal joints are frequently used for connecting opposite ends of shafts which are mounted so that the parts of each joint must be separated without requiring endwise or angled movement of either shaft.

In one proposed universal joint, shouldered trunnions are slidable into and out of a coupling member and maintained in position therein by a stop member which is itself retained either by screw or wedge means; but in such joint for its assembly or disassembly, access to the stop member retaining means must be had either through the yoke bores in which the connected shaft ends fit, or by substantially angling the yokes and connected shafts, making it practically impossible to use such a joint in connection with shafts which cannot be so moved or angled.

A usual universal joint includes two sets of right angled trunnions, and is a specific form of a pivot joint, and as herein used the term "pivot joint" includes any joint apparatus having two or more parts connected by one or more pivot pins.

The objects of the present improvements include the provision of an improved pivot joint, preferably a universal joint, in which the assembly and disassembly of the parts thereof is effected by a single positive retaining member preferably without requiring the use of screw threads on any of the parts, and in which all the parts are slidably releasable one from another when the retaining member is removed, whereby very rapid assembly and disassembly of the joint may be effected.

Further objects of the present improvements include the provision of an improved pivot joint, preferably a universal joint in which all the parts are full floating with respect to each other, thereby minimizing wear and enabling adequate lubrication.

Further objects of the present improvements include the provision of an improved pivot joint, preferably a universal joint adapted for connecting opposite ends of shafts, and which may be assembled and disassembled without longitudinal or angular displacement of the shafts connected thereby.

Further objects of the present improvements include the provision of an improved pivot joint, preferably a universal joint adapted for utilizing pivot pins of any desired size for attaining desired strength and bearing area, and also adapted for utilizing any desired form of bearings for the pivot pins.

Further objects of the improvements include the provision of an improved pivot joint, preferably a universal joint adapted for economical production, and requiring relatively simple machining operations on the parts thereof.

The foregoing and other objects are attained by the pivot joint apparatus, parts, combinations, and sub-combinations, which comprise the present invention, and the nature of which is set forth in the following general statement, and preferred embodiments of which are set forth by way of example in the following description, and which are particularly and distinctly pointed out and set forth in the appended claims forming part hereof.

The nature of the improved pivot joint apparatus of the present invention may be stated in general terms as including in a universal joint, two yokes having a pivot block interposed therebetween, and the block and the yokes having formed therein four sets of registering trunnion bores, and there being a trunnion in each set of bores.

The pivot block also has formed therein a shouldered slide cam bore communicating with and intersecting the inner ends of the block trunnion bores.

A slide cam is located in the slide cam bore and includes an enlarged head and a reduced stem and a tapered shoulder between the head and the stem.

The inner ends of the trunnions abut the cam head, and the cam shoulder is opposed by the bore shoulder, and the cam stem extends outside of the pivot block when the joint is assembled.

The slide cam is maintained in assembled position by means including a stop member such as a cotter pin separably engaging the cam stem in a transverse aperture outside the pivot block and removable from one side of the cam stem.

Figure 2:
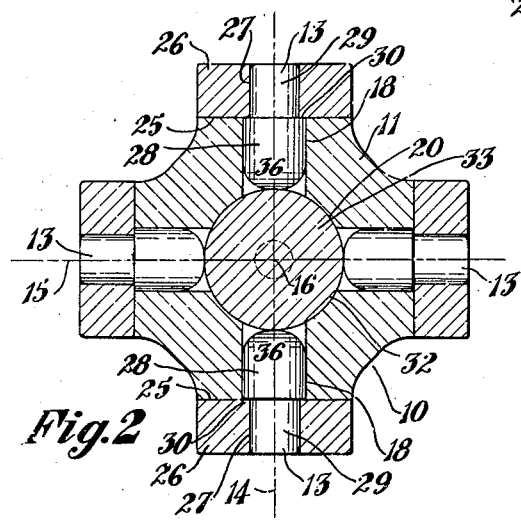
Figure 4:
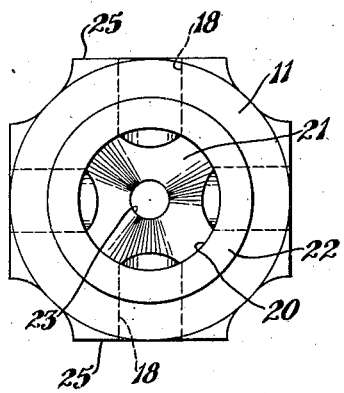
Figure 3:
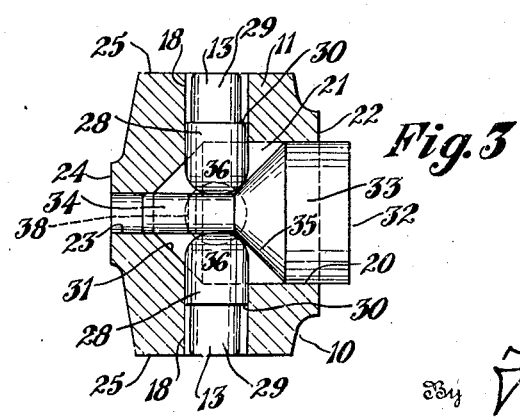

By way of example, a universal joint embodying the present improvements is illustrated in the accompanying drawing forming part hereof, in which Figure 1 is an elevation view thereof with portions broken away and illustrated in section;

Fig. 2, a transverse sectional view thereof, as on line 2—2, Fig. 1;

Fig. 3, a view of the pivot block thereof with portions broken away and illustrated in section, separated from the yokes, showing the trunnions retracted and also showing the slide cam moved to its position permitting retraction of the trunnions; and Fig. 4, an end view of the pivot block looking towards the larger opening of the slide cam aperture thereof.

Similar numerals refer to similar parts throughout the drawing.

The illustrated embodiment of the improved pivot joint is in the form of a universal joint indicated generally by 10 and includes a pivot block 11, two clevises or yokes 12, and a plurality of pivot pins or trunnions 13, as shown two for each yoke, pivotally connecting the pivot block and the yokes.

One set of two of the trunnions 13 have their longitudinal axes on an axis of pivoting indicated by the dot-dash line 14 and the other set of two trunnions 13 have their longitudinal axes on an axis of pivoting indicated by the dot-dash line 15 intersecting the axis 14 at the center 16 of the pivot block.

A third axis at right angles to the axes 14 and 15 is indicated by the dot-dash line 17 and passes through the center of the pivot block 16.

The pivot block has formed therein a set of two trunnion bores 18 coaxial with the axis 14 and another set of two trunnion bores 18 coaxial with the axis 15, each bore 18 is adapted for slidably fitting and receiving one of the trunnions 13.

The pivot block 11 furthermore has formed therein a slide cam aperture as shown a shouldered or flanged bore 20 coaxial with the axis 17, and the inner ends of the bores 18 open into and communicate with the enlarged portion 21 of the shouldered bore 20.

The shouldered bore enlarged portion 21 has an outer end opening in one end face 22 of the pivot block 11, and the shouldered bore 20 furthermore includes a reduced portion 23 having an outer end opening in the other pivot block end face 24.

Each of the trunnion bores 18 has an outer end opening in a side face 25 of the pivot block 11, each side face 25 being at right angles with its associated pivot pin bore 18.

The yokes 12 each include two fork or U arm members 26 which embrace the pivot block 11 and each yoke arm 26 is located opposite one of the pivot block side faces 25, preferably as shown in rotatable abutment therewith.

Each yoke arm member 26 has formed therein a trunnion bore 27 for slidably fitting and receiving the outer end of one of the trunnions 13.

The trunnions 13 are arranged for sliding in the pivot block bores 18 cross wise of the slide cam bore 20 for extension and retraction into and out of the yoke arm trunnion bores 27.

Means are provided for stopping displacement of each trunnion outwardly from the slide cam bore, as by forming each trunnion as a shouldered pin with an enlarged head 28 slidably fitting in its pivot block bore 18 and with a reduced shank 29 slidably fitting in its yoke arm bore 27, and with a shoulder or flange 30 between the enlarged head 28 and the reduced shank 29 for abutment against the opposed face of the yoke arm 26 connected by the particular trunnion 13.

As shown and preferably, the slide cam bore enlarged portion 21 is cylindric and the reduced portion 23 is also cylindric and between the enlarged portion 21 and the reduced portion 23 there is a conical shoulder or flange 31.

The slide cam 32 is slidably mounted in the slide cam bore 20, and includes an enlarged cylindric head 33 slidably fitting in the enlarged bore portion 21, and a reduced cylindric stem 34 slidably fitting in the reduced bore portion 23, and a conical flange or shoulder 35 extending between the opposite ends of the head 13 and the stem 34.

The slide cam shoulder 35 operates against the preferably dome-shaped or hemispherical inner ends 26 of the trunnions 13 for extending the same outwardly from the pivot block into the yoke arm bores, and the slide cam shoulder 35 also operates as a stop against the bore shoulder 31.

The enlarged head 33 of the slide cam 32 abuts against the inner ends 36 of the trunnions 31 for maintaining the same extended with their shanks 29 in pivotal engagement with the yoke arm bores 27, as best shown in Fig. 1.

In the assembled joint 10, the slide cam stem 34 extends beyond the pivot block end face 24, and separable securing means are provided operating between the slide cam and the pivot block for maintaining the slide cam in assembled position, the separable securing means including a securing member laterally removable from one side of the joint 10, and as shown the securing means is in the form of a separable stop means engaging the stem 34 outside of the pivot block 11, and constituting a cotter pin 37 in a transverse aperture 38 formed in the stem 34.

In the improved joint 10, the parts of which are thus held together by the stop cotter pin 37, the slide cam 32 and the pivot pins 13 are free to rotate, creep, or float in use thereby equalizing wear.

The improved joint 10 thus described is very rapidly and quickly disassembled by laterally removing the cotter pin 37 sidewise from the slide cam stem 34 and moving the slide cam 32 towards the pivot block end face 22 and out of the pivot block 11 to the position shown in Fig. 3 in which the trunnions 13 may retract and disconnect from the yoke arms 26, whereby the joint 10 may be disassembled without angling or moving endwise either of the yokes 12, since after retraction of the trunnions 13 from connection with the yoke arms 26, only a lateral movement of each yoke is required to separate the same from the pivot block.

The assembly of the joint 10 is very quickly carried out by reversing the above operations for disassembly.

I claim:

1. In universal joint construction, two yokes, a pivot block interposed between the yokes, the pivot block and the yokes having formed therein four sets of registering trunnion bores, four trunnions, one trunnion in each set of bores, the pivot block having formed therein a shouldered slide cam bore communicating with and intersecting the inner ends of the block trunnion bores, a slide cam in the slide cam bore, the slide cam including an enlarged head and a reduced stem and a tapered shoulder between the head and the stem, the inner ends of the trunnions abutting the enlarged cam head and the cam shoulder being opposed by the bore shoulder and the cam stem extending outside of the pivot block when the joint is assembled, and means for maintaining the slide cam in assembled position including a stop member separably engaging the cam stem outside the pivot block and removable from one side of the cam stem.

2. In separable pivot joint construction for a universal joint and the like, a yoke including a set of U arms, a pivot block located between the arms of the yoke, the pivot block having formed therein a set of two opposite alined trunnion bores, one trunnion bore for each of the two yoke arms, each yoke arm having formed therein a trunnion bore registering with one of the pivot block trunnion bores, the pivot block having also formed therein a shouldered slide cam bore extending therethrough and intersecting and communicating with the inner ends of the trunnion bores thereof, a trunnion in each pivot block trunnion bore, and a slide cam in the slide cam bore, the slide cam including an enlarged head and a reduced stem and a tapered shoulder between the stem and the head, the trunnions extending from the pivot block into the yoke arm bores and the inner ends of the trunnions abutting against the enlarged head of the cam and the shoulder of the cam being opposed by the shoulder of the cam bore and the stem of the cam extending outside of the pivot block when the joint is assembled, and means for maintaining the slide cam in assembled position including sidewise separable stop means engaging the stem outside of the pivot block and being removable from one side of the stem.

3. In separable pivot joint construction for a universal joint and the like, a pivot block, the pivot block having formed therein a trunnion bore and a shouldered slide cam bore intersecting and communicating with the inner end of the trunnion bore, a trunnion in the trunnion bore, and a slide cam in the slide cam bore, the slide cam including an enlarged head and a tapered shoulder at one side of the head, the trunnion extending from the pivot block and the inner end of the trunnion abutting against the enlarged head of the cam and the shoulder of the cam being opposed by the shoulder of the cam bore when the joint is assembled, and separable securing means operating between the slide cam and the pivot block for maintaining the slide cam in assembled position, the separable securing means including a securing member laterally removable from one side of the joint.

ROBERT L. WONDERLY.